Feb. 17, 1931.  G. MANIERRE  1,792,501
CONVEYER
Filed April 12, 1927   5 Sheets-Sheet 1

Inventor.
George Manierre
By Daniel Brennan
Attorney.

Feb. 17, 1931.  G. MANIERRE  1,792,501
CONVEYER
Filed April 12, 1927   5 Sheets-Sheet 2

Inventor.
George Manierre
By Daniel Brennan
Attorney.

Feb. 17, 1931.　　　G. MANIERRE　　　1,792,501
CONVEYER
Filed April 12, 1927　　5 Sheets-Sheet 5

Inventor.
George Manierre
By Daniel Brennan
Attorney.

Patented Feb. 17, 1931

1,792,501

UNITED STATES PATENT OFFICE

GEORGE MANIERRE, OF MILWAUKEE, WISCONSIN

CONVEYER

Application filed April 12, 1927. Serial No. 183,177.

This invention relates to improvements in conveyers.

An object of the invention is to provide operatively interconnected conveyers for common adjustment and common drive and to arrange the conveyers in such relation to each other that one of them will receive the material carried by the other.

It is also an object of the invention to provide a chain conveyer in association with a belt conveyer in such manner that the chain conveyer may pick up heterogeneous material of coarse and fine particles to deliver the same to the belt conveyer without running the risk of having the operation of the chain conveyer interrupted by the fines forming a part of the material to be picked up by the chain conveyer.

It is another object of the invention to provide in a conveyer of this type, means for eliminating the fines which may happen to drop through or past the links of the chain conveyer and for returning said fines to a position in which they will again enter the operative field of the chain conveyer to be carried thereby.

It is, furthermore, an object of the invention to provide a conveyer of this type for picking up and carrying heterogeneous material and to provide means for preventing binding of the conveyer on the casing in which it is supported.

Another object of the invention resides in the provision of an additional conveyer for eliminating the fines and in the provision of means for directing said fines to a position in which they may be acted on by the conveyer, whereby an accumulation of fines is prevented, since otherwise this accumulation of fines would have a tendency to gradually change the position of the conveyer relatively to its support and to interfere with the proper operation of the same.

It is another object of the invention to provide in connection with the driving means for a chain conveyer or the like a screw conveyer in a position to receive the fines and to actuate said screw conveyer by the operating means for the chain conveyer, whereby the fines are prevented from accumulating and are prevented from binding the conveyer in the casing in which it is supported.

The invention also has the object of providing in association with the common actuating means for a chain conveyer and for a screw conveyer arranged in position to receive the fines dropping from the chain conveyer, common adjusting means, whereby upon alteration of the position of the actuating means for the chain conveyer simultaneously also an alteration of the actuating means for the screw conveyer is effected.

While heretofore combinations of belt conveyers with bucket conveyers were known, the present construction has several advantages over these known conveyers, the latter having been used successfully for loading coal but having not been successful for carrying stone, gravel or sand. The last named material always carries a larger percentage of fines which leak through the upper to the under run of the conveyer, and thereby finally raise the conveyer from the pitch line of the sprocket and cause the chain to tighten and bind. Owing to the provision of means for receiving the fines and eliminating them from the carrying run of the conveyer, the continued operation of this chain conveyer is assured. The chain conveyer, if composed of several juxtaposed strands forming an apron also is suitable to a higher degree for digging into a pile of gravel, sand or stone, permitting the material from the pile to travel with the apron in a relatively thick layer, so that per time unit larger quantities of material can be carried than with a bucket conveyer or the like.

The chain conveyer also has the advantage of permitting the provision of a much smaller radius to the entering edge than is feasible in a bucket conveyer, thereby decreasing the leverage which would have a tendency to break the chain. The chain conveyer also can be made much heavier and stronger when it is intended to carry the material directly thereon than the known link conveyer on which the buckets or other individual carriers are mounted.

With the objects enumerated above and many additional objects in view, an embodiment of the invention is described in the following specification and is shown in the accompanying drawings.

The tractor illustrated is shown to be of the self-track-laying type comprising the frame 1, and wheels over which the track chain 2 is trained, and the engine 3, the entire device being of any known or suitable type for advancing a relatively heavy load over any desired even or uneven ground.

Figure 4:
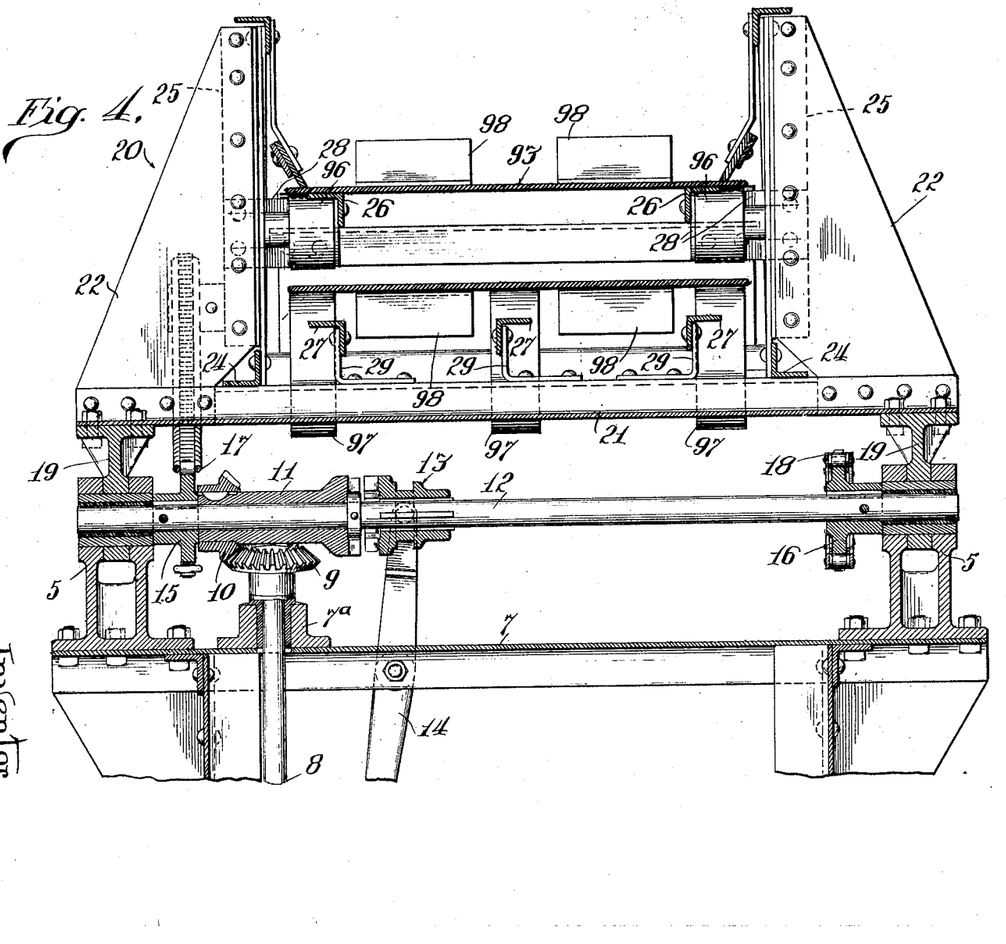
Fig. 4 is, on a larger scale, a section through the belt conveyer and the driving mechanism for the same on line 4—4 of Fig. 1.

A superstructure comprising uprights 4, 4a and 4b is secured to the frame 1 of the tractor for receiving at its upper end bearing brackets 12, Fig. 4, in which the shaft 5 is rotatably supported. The uprights 4, 4a and 4b support at their upper ends a transverse plate or channel 7, by which the uprights are held rigidly together at the top.

Through a suitable clutch connection which is not illustrated in detail, and which does not form the subject matter of the present invention, the engine drives selectively a shaft 8 which extends from the tractor upward to be supported in a bearing 7a on the plate 7 and which carries at its top end a bevel gear 9 permanently in engagement with a bevel gear 10 keyed to a sleeve 11 which is loosely mounted on the shaft 12. The shaft 12 may be coupled with the driven sleeve 11 by means of a movable clutch sleeve 13 of known construction having formed on one end face clutch teeth which are adapted to engage corresponding clutch teeth on the driven sleeve 11.

The coupling member 13 may be shifted to operative position relatively to the sleeve by a hand lever 14, the manipulating end of which is within reach of the operator who occupies the seat on the tractor frame provided for him.

The shaft 12 also carries adjacent its bearings 5 two sprocket wheels 15 and 16 over each of which a driving chain 17 and 18 respectively is placed, whereby upon rotation of the shaft 12 movement is imparted to said chains.

The ends of the shaft 12 serve for carrying pivot bearing brackets 19 to which the conveyer casing, indicated as a whole at 20, is secured by means of a transverse main channel 21 and plates 22. The conveyer casing comprises longitudinally extending sills 24 intermediate diagonal tension members and upright struts 25, the whole structure forming an open lattice-work. Additional longitudinal sills 26 and 27, Fig. 4, are supported between the side walls of the structure on suitable brackets 28 and 29 to enhance the rigidity.

Figures 2, 8, 9:
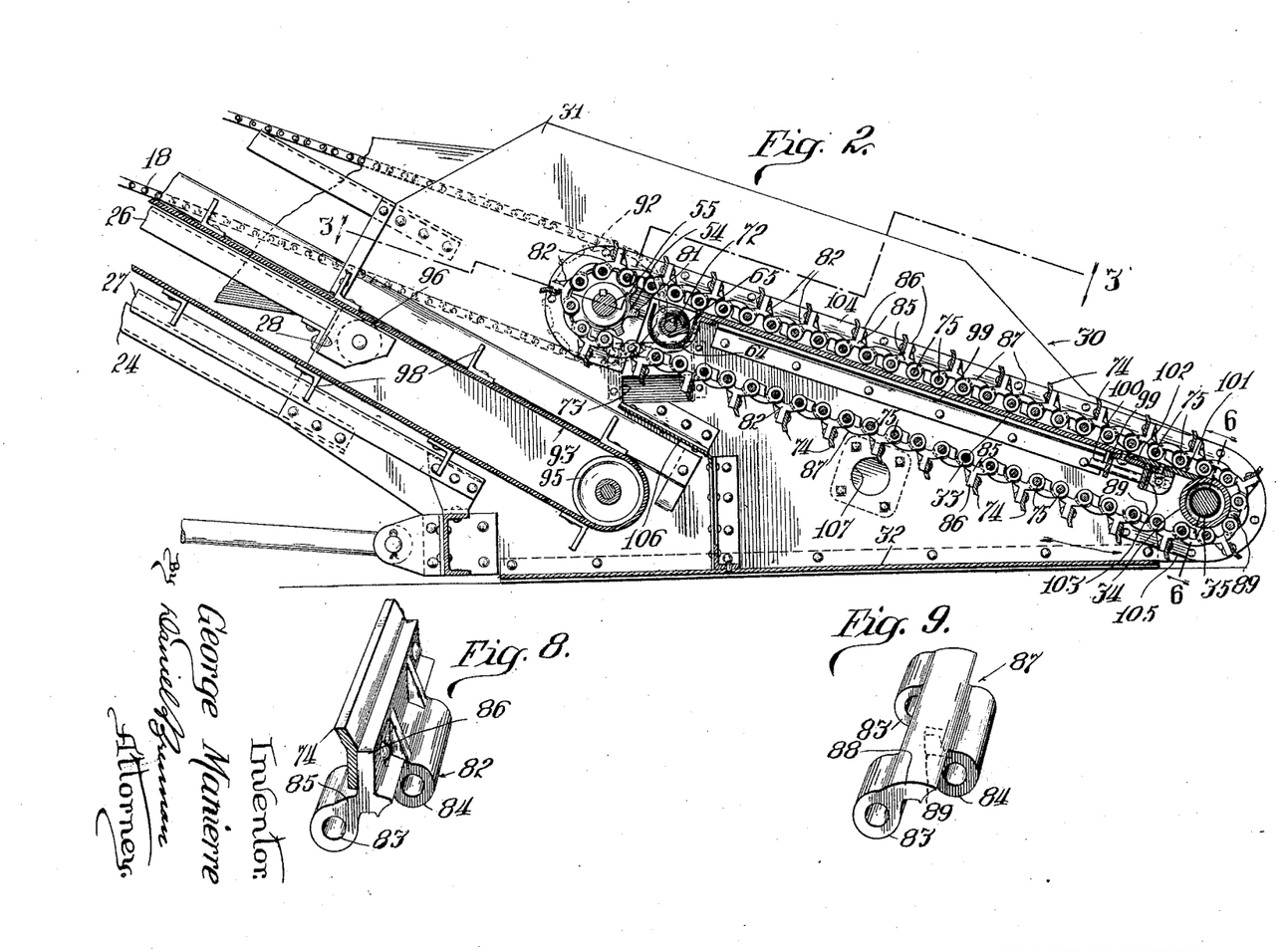
Fig. 2 is a central longitudinal section through the conveyer mechanism on a slightly larger scale.
Figs. 8 and 9 are perspective views of links of which the link conveyer is composed.

Rigidly attached to the lower ends of the longitudinal sills 24 there is secured a box or housing 30 in which a chain conveyer is located. This casing, as illustrated in Fig. 2, comprises the lateral wall plates 31, the height of which is greatly reduced at the front end of the casing, the two walls 31 being joined together at the bottom by a plate 32, Fig. 2, and intermediate their height another plate 33 extends substantially parallel to the slanting upper edges of the walls.

Figure 6:
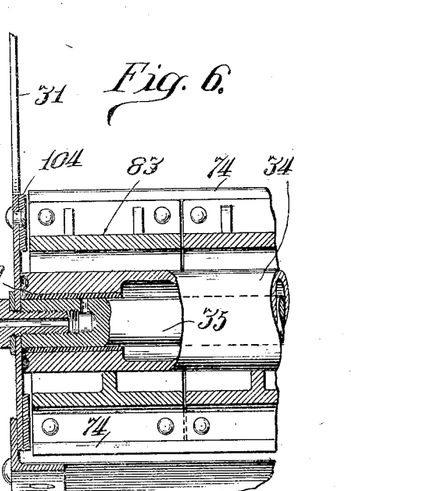
Fig. 6 is a detail sectional view taken on line 6—6 of Fig. 2, on a larger scale, through the front supporting roller of the link conveyer.

The reduced front end of the box 30 receives, as shown in Fig. 6, a pulley roller or drum 34 which is supported at its ends on a shaft 35 extending crosswise of the casing for stiffening the same, and which is united with the walls, as for instance, by headed screws 36 projecting through the walls into tapped bores in the ends of the shaft. The screws 36 have oil bores from which branch passages 36 extend to bearing bushings 39 interposed between the shaft 35 and the roller 34 for lubrication.

Figures 1, 10, 11:
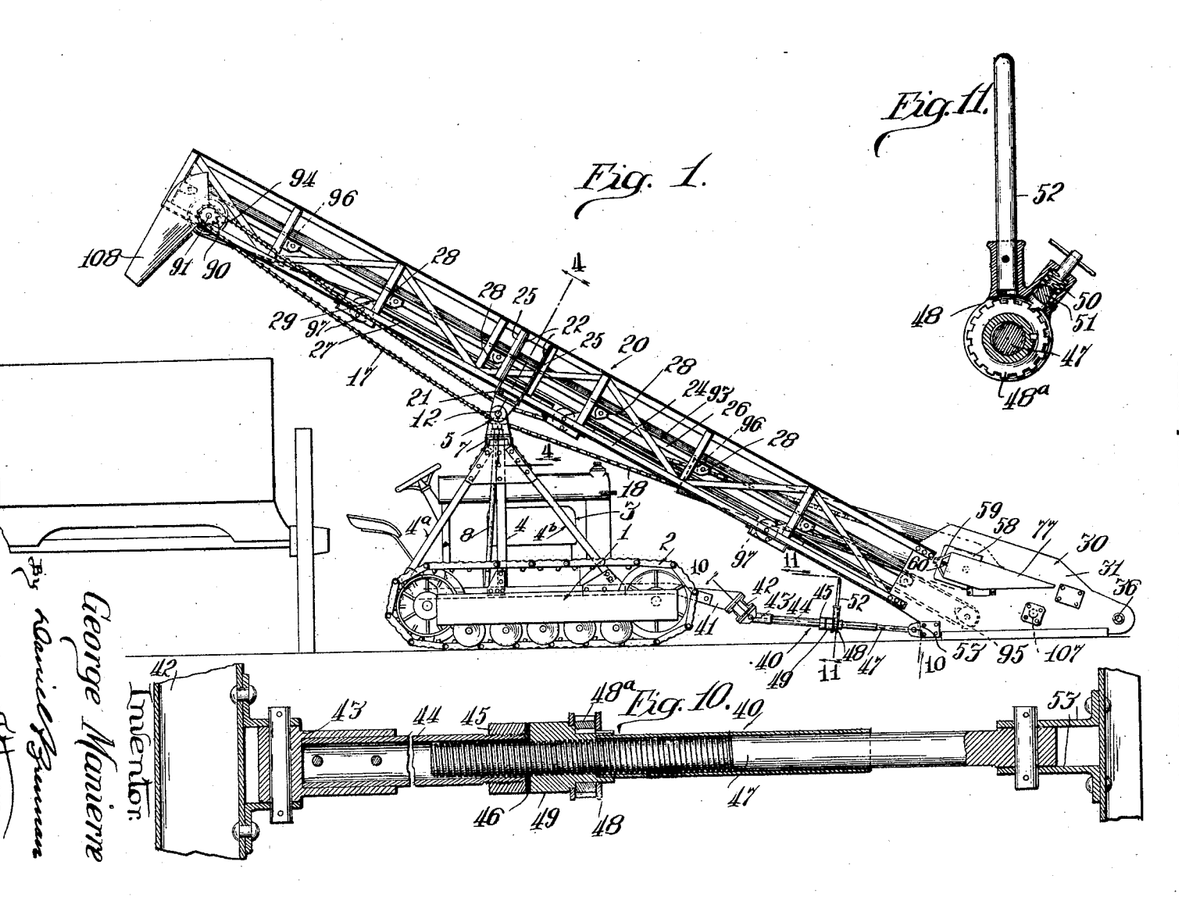
Fig. 1 is a side elevation of the machine.
Fig. 10 is partly a sectional view and partly elevation of the adjusting mechanism connecting the link conveyer casing with the tractor frame.
Fig. 11 is a detail sectional view on a larger scale taken on line 11—11 of Fig. 1.

For the purpose of perfecting the connection between the mounting structure of the conveyers, namely the joined structure 20 and 30 and the frame 1 of the transportable support, and for increasing the stability of the entire machine, an additional strut 40 adjustable angularly as well as longitudinally is interposed between the rear end of the casing 30 and the frame of the tractor. Arms 41 on the front end of the tractor frame are united by a transverse beam 42, as illustrated in Fig. 1. This transverse beam 42 supports pivotally a head 43 which is fixedly connected with a tubular part 44, the front end of which has a screw thread for mounting the abutment 45. A screw threaded spindle 47 extends into the tubular part 44 and carries a nut 49 thereon which in the operation of the machine is forced against a thrust washer 46 on the tube 44 in front of the abutment 45.

A hand ratchet, as shown in detail in Fig. 11 is associated with the nut 49, for shifting the same on the spindle 47. The ratchet consists of a ring 48 surrounding a toothed portion 48a of the nut and having a socket 50 for receiving a spring controlled pin 51 adapted to engage the ratchet teeth or to be withdrawn therefrom, and also having a socket in which an operating handle 52 is secured.

By varying the position of the nut 49 on the spindle 47, it is obvious that the latter may enter the tube 44 to a varying depth, and since the opposite end of the spindle 47 is in pivotal connection with the casing 30 through brackets 53 at the rear end thereof the device permits of an angular adjustment of the joint mounting structure 20, 30 for the conveyers relatively to the superstucture of the tractor forms.

Figure 5:
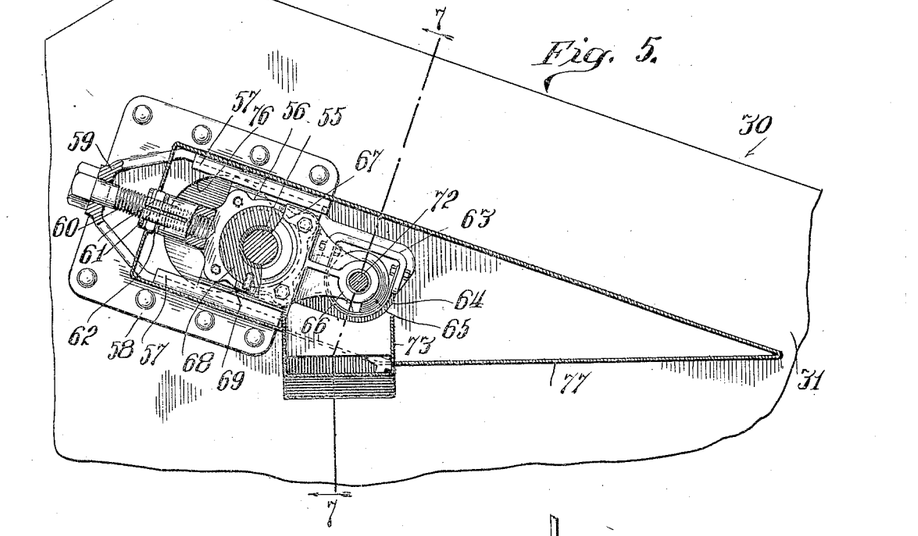
Fig. 5 is a longitudinal section on line 5—5 of Fig. 3 through the bearing for the sprocket shaft and screw-conveyer shaft.

The chain conveyer is trained over a sprocket 54 keyed to a shaft 55 located near the upper end of the casing 30 and having its support in bearings 56 on the outer side of the lateral walls 31. The bearings are adjustable relatively to the roller 34 for the purpose of maintaining the link conveyer under the desired tension. They, therefore, are each guided in guide ways 57 forming parts of a bracket 58 which is fixed to the outer side of the plate 31. This bracket also has a yoke 59 formed integral therewith, Figs. 3 and 5, for receiving rotatably an adjusting screw 60. This screw enters into a tapped and slitted lug 61 extending from the bearing 56, whereby upon rotation of said screw, the bearing may be shifted in a direction at right angle to the axis of shaft 55 in the guides 57. By drawing together the parts of the lug, as by a nut 62, the bearing 56 will then be maintained in its adjusted position.

Another projection 63 extends from the bearing 56 in a direction opposite to the lug 61 and serves as a bracket for a conveyer trough 64 extending cross-wise of the casing 30 and holding a screw conveyer 65. The shaft 72 of this conveyer is rotatably mounted in bearings 66 forming extensions on a cap 67 which is bolted to the outer surface of the bearing member 56. The conveyer 65, as well as its trough 64 is, therefore, adjustable simultaneously with the bearing 56 by means of the screw 60. The bearing bushing or brass 68 supporting shaft 55 has a lug 69 with a part spherical surface, partly engaged by the bearing 56 and partly by the cap 67 to render this adjustment possible without binding or cramping the drive shaft.

Figure 7:
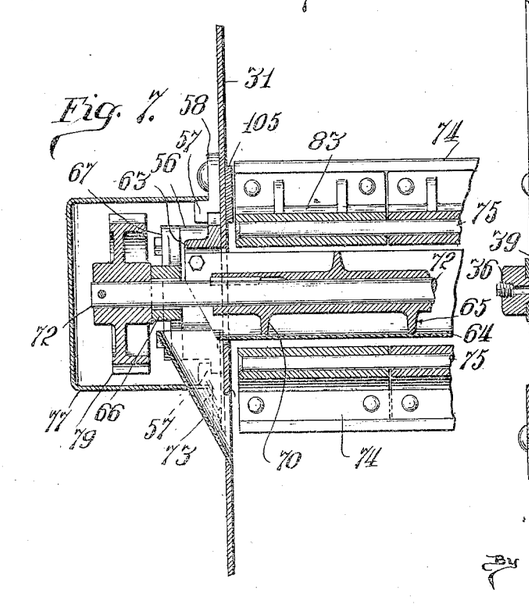
Fig. 7 is a detail sectional view axially of the screw conveyer, taken on line 7—7 of Fig. 5.

The screw conveyer 65, as shown in Fig. 7, is formed of a sleeve provided with helically projecting ribs or vanes 70. From Fig. 3 it is also apparent that this conveyer is composed of two sections 71, each section having a sleeve with its helix extending in opposite direction to that of the other section, and the sleeve sections being keyed at their ends to the shaft 72. Owing to this arrangement the two sections of the screw conveyer will gradually force the material deposited in the trough laterally in opposite directions towards the side walls 31 and outward through the opening in the side wall through which the trough 64 extends. The ends of the trough may be cut on a slant, as shown in Fig. 7, and arranged in communication with said receiving opening of the chute. The casing 30 has chutes 73 for guiding the material discharged at the walls of the trough downward into the interior of the lower part of the casing 30.

Figure 3:
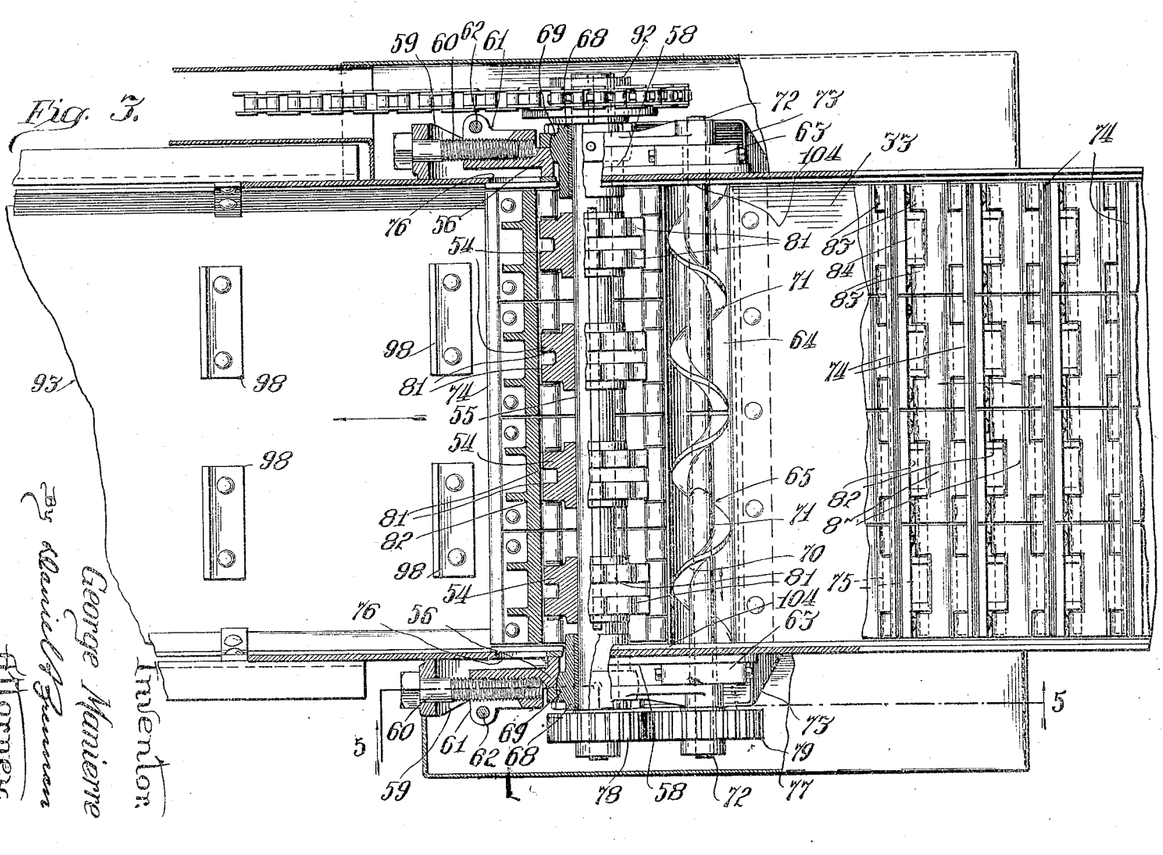
Fig. 3 shows on a larger scale a top plan view partly in section on lines 3—3 of Fig. 2, of the link conveyer and the adjoining end of the belt conveyer.

The link conveyer in the embodiment shown is formed of several strands of endless sections, four being shown in Fig. 3, and each of these sections is shown as being driven by a separate sprocket 54 suitably mounted on the shaft 55. The sections are positively prevented from attaining differential speeds, owing to the provision of scraper bars or ribs 74, each secured to links of all of the sections as illustrated in Fig. 3. From Fig. 7 it is also apparent that the pintles 75 for interconnecting the links of the various sections also extend through the four sections, thereby further preventing the disalignment of the links.

The adjustment of the shaft 55 supporting the sprockets 54 is made possible owing to the provision of the openings 76 in the lateral walls 31 of the casing 30, said lateral walls also being provided with openings in which the trough 64 of the screw conveyer may be displaced.

To protect the bearings 56 and 66 a box 77 is secured to the outside of the wall 31 of the casing 30, said box also covers the inlet of the chute 73 through which the material forced outward by the screw conveyer is returned into the interior of the casing. A similar box also is provided on the opposite side of the structure to protect the bearings for the shafts as well as the chain 18 located on that side.

By reference to Fig. 3, it will be noted that the drive of the screw conveyer 65 is derived directly from the sprocket shaft 55 since one end of the latter carries a gear 78 in mesh with a spur gear 79 at the corresponding end of the conveyer shaft 72. Since the two bearings for these shafts are adjusted simultaneously, the proper intermeshing relation of the gears will always be maintained.

From Figs. 3, 8, and 9 the detail construction of sprockets and links of the conveyer will become evident. Each sprocket is provided with two axially spaced sets of teeth 81. The links 82, Fig. 8, have a pair of axially spaced pintle sleeves 83 and a single sleeve 84 midway between the same and of the chutes, the lower end of this plate 106 being deflected in a substantially vertical direction and being secured to angle bars which are riveted to the lateral walls 32 of the box.

In the operation the tractor engine is operated to advance the entire machine with the casing 30 foremost into a pile of sand, gravel, stone or other heterogeneous material, whereupon the clutch lever 14 is actuated to impart the driving movement to the chains 17 and 18 through which the apron conveyer, as well as the belt conveyer, are put in motion. The ribs 74 extending crosswise of the casing and secured to the alternate links 82 of the several strands of the apron conveyer take the material from the pile and the conveyer carries the material towards the upper end of the casing to discharge it onto the lower end of the belt conveyer 93 where it may slide towards the angles riveted at predetermined intervals to the belt. The fines passing between the individual strands of the apron will drop onto the plate 33 or they will be taken along by the links to be discharged into the conveyer trough 64 located at the upper end of casing 30 in order to be carried outward towards the two side walls 31 and to be returned through the chutes 73 into the interior of the casing 30. The accumulation of material in the interior of this casing may be observed through a peep-hole 107 which may be provided in one or both spaced therefrom in direction of the travel of the chain. The pintle sleeves are connected by a bridge portion 85, the inner face of which corresponds to the operative face of the sprocket teeth. The bridge portion 85 carries an upstanding flange 86 for receiving the scraper bar or rib 74.

The other links 87 are similarly constructed; the bridge 88, however, has no flange. These connecting links 87 have lugs 89 on the inner surface of the bridge 88 adapted for traveling between the two sets of axially spaced teeth on the sprockets to maintain the conveyer against axial displacement.

Of the two sprockets 15, 16 secured to the shaft 12, as illustrated in Fig. 4, one of them, as for instance the left hand sprocket 15 is utilized as a driving sprocket for the chain 17 leading to another sprocket 90 on a shaft 91 which is mounted near the upper end of the belt conveyer supporting structure 20. The sprocket 16 which may be somewhat heavier in construction, as illustrated in Fig. 4, supports the chain 18 leading to the sprocket 92 on shaft 55. It will be seen, therefore, that the two conveyers are operated simultaneously from the same driving shaft 12. The apron of chain conveyers operating in the casing 30 serves for carrying coarse and fine material to the upper end of the casing and for delivering it to the belt conveyer 93 intermediate the two rollers or pulleys 94, 95, the belt conveyer being supported at spaced points in the structure 20 by rollers 96 mounted on shafts which are supported in brackets 28 projecting from the vertical struts of the structure. While the rollers 96 support the marginal portions of the upper run of the belt conveyer 93 and prevent lateral spilling of the load, other rollers 97 are mounted adjacent some of the vertical struts 25 in a position to support the lower or idle run of the belt conveyer to prevent excessive sag. The conveyer belt 93 is provided at predetermined intervals with lugs in the form of angle bars 98 riveted or secured in any suitable way to the material of which the belt is made for the purpose of preventing a sliding movement of the material thereon.

The upper plate 33 in casing 30 is rigidly secured at its front margin to a transverse angle bar 99 provided with openings, not shown, to serve as a guide, for lugs or pins 100 of a scraper device 101 acting on the roller or drum 34. For this purpose the front edge of a plate 102 extends very closely to the surface of the roller 34, to prevent the discharge of material from the roller into the interior of the casing. The plate 102 is secured to the transverse angle bar 103 guided in the walls 31 of the casing and having the lugs or pins 100 passing through the transverse bar 99. The scraper plate 102 will, therefore, be yieldingly forced into engagement with the roller 34 owing to its own weight, and that of the upper plate 33, or it may be secured adjacent the roller with a fixed adjusted clearance.

Owing to the plate 33 supporting the operative run of the apron, the escape of fines between adjacent units of the conveyer is prevented, and extremely fine material only may pass at the outer sides of the entire apron, or it may drop directly into the conveyer trough 64. To prevent excessive wear by the discharge of the fine material carried by the apron conveyer at the ends of the same, which travel adjacent the walls 31, wear plates 104 are fastened to the walls 31 extending substantially parallel to the direction in which the upper run of the conveyer travels, and similar wear plates 105, which, however, are shorter are mounted closely to the forward opening of the casing 30, as indicated in Fig. 2, since at this point the scraper ribs 74 will drag the material accumulated gradually in the interior of the box above the plate 32 to the forward end to return the same to the pile from which the material is being removed by the forcible introduction of the apron conveyer into the same.

For delivering the fines carried by the screw conveyer into the chutes 73 into the forward part of the casing 30 a slanting transverse plate 106 extends crosswise through the same adjacent the discharge end of the chutes, the lower end of this plate 106 being deflected in a substantially vertical direction and being secured to angle bars which are riveted to the lateral walls 32 of the box In the operation the tractor engine is operated to advance the entire machine with the casing 30 foremost into a pile of sand, gravel, stone or other heterogeneous material, whereupon the clutch lever 14 is actuated to impart the driving movement to the chains 17 and 18 through which the apron conveyer as well as the belt conveyer are put in motion. The ribs 74 extending crosswise of the casing and secured to the alternate links 82 of the several strands of the apron conveyer take the material from the pile and the conveyer carries the material towards the upper end of the casing to discharge it onto the lower end of the belt conveyer 93 where it may slide towards the angles riveted at predetermined intervals to the belt. The fines passing between the individual strands of the apron will drop onto the plate 33 or they will be taken along by the links to be discharged into the conveyer trough 64 located at the upper end of casing 30 in order to be carried outward towards the two side walls 31 and to be returned through the chutes 73 into the interior of the casing 30. The accumulation of material in the interior of this casing may be observed through a peep-hole 107 which may be provided in one or both walls 31 and which is normally covered by a plate. If the accumulation of the material in the interior of this casing reaches a certain height, the ribs 74 on the apron, extending downward on the lower run of the apron, will scrape this material forward back onto the pile from which it will be removed again in the continued operation of the machine. The material discharged at the upper end of the apron drops into the belt conveyer which carries it to the upper end of the structure 20 and delivers it to a chute 108 to facilitate the discharge of this material into a wagon or other vehicle, as illustrated in Fig. 1.

I claim:

1. In a device of the character described, the combination of a chain conveyer consisting of a plurality of endless strands of link chains, a sprocket over which said chain conveyer is trained, a casing in which said chain conveyer and sprocket are mounted, and means for returning fines dropping past the links of the chain conveyer to a position in which said chain conveyer may again pick up and carry said fines.

2. In a device of the character described, the combination of a chain conveyer composed of a plurality of strands of link chains, sprockets for driving said link chains, actuating means for said sprockets, a screw conveyer extending transversely of the direction of travel of the chain conveyer adjacent the sprockets, and means for returning the material advanced by the screw conveyer to a position for carriage by the chain conveyer.

3. In a device of the character described, the combination of a chain conveyer, a sprocket over which said chain conveyer is trained, a screw conveyer adjacent the sprocket, said screw conveyer being adapted to carry material transversely of the traveling direction of the chain conveyer to opposite sides, a casing supporting said chain conveyer, and means for returning the material carried by the screw conveyer to the interior of the casing.

4. In a device of the character described, the combination of a chain conveyer, a sprocket over which said chain conveyer is trained, a casing in which said chain conveyer is supported in such manner as to pick up and carry material from outside the casing, a screw conveyer supported in said casing, and means for returning the material carried by the screw conveyer to the interior of the casing.

5. In a device of the character described, the combination of a chain conveyer composed of a plurality of strands of chains, a casing supporting said chain conveyer and having lateral walls closely adjacent the outer surfaces of the outermost strands of chains, said chain conveyer being adapted to pick up and carry material from a point outside the casing, a screw conveyer in position to receive fines dropping between the links and to carry them to the outer side of the same, delivery chutes directing the material carried by the screw conveyer to the interior of the casing, and common actuating means for said chain conveyer and screw conveyer.

6. In a device of the character described, the combination of a chain conveyer, a casing in which said chain conveyer is mounted, a plate supporting the upper strand of said chain conveyer, a screw conveyer in position to receive material dropping between the links of the chain conveyer, and delivery chutes directing the material carried by the screw conveyer to a position below said supporting plate.

7. In a device of the character described, the combination of a chain conveyer, a casing in which said chain conveyer is mounted, a plate in said casing supporting the operative portion of said chain conveyer, another plate below the same, a screw conveyer in position to receive the material dropping between the links of the chain conveyer, and delivery chutes adapted to direct the material carried by the screw conveyer between said plates.

8. In a device of the character described, the combination of a chain conveyer, a casing in which said chain conveyer is mounted, a screw conveyer in position relatively to the chain conveyer to receive the material dropping from said chain conveyer between its links, a slanting plate in said casing extending between longitudinal walls of the casing, a bottom plate rigidly connecting said longitudinal walls, and delivery chutes directing the material carried by the screw conveyer to the space between said plates.

9. In a device of the character described, a chain conveyer, a casing in which said chain conveyer is mounted to travel in a slanting direction, the casing having lateral walls, a plate supporting the operative portion of said chain conveyer and extending between said walls, a bottom plate connecting the lateral walls of the casing, and means for returning material dropping between the links of the chain conveyer to the interior of the casing between said plates.

10. In a device of the character described, the combination of a chain conveyer, a casing in which said chain conveyer is mounted to travel in a slanting direction, a sprocket wheel over which said chain conveyer is trained at the upper turning point, a smooth pulley over which said chain conveyer is trained at the lower turning point, shaft supporting said sprocket and pulley, the casing having lateral walls, bearing elements for said shafts supported by the walls, and actuating means for the sprocket.

11. In a device of the character described, the combination of a chain conveyer, a casing in which said chain conveyer is mounted to travel in a slanting direction, the casing having lateral walls, a sprocket and a smooth drum over which said chain conveyer is trained, supporting means for said sprocket and drum mounted in the casing, a screw conveyer positioned relatively to the chain conveyer for receiving fines dropping through the links of the chain conveyer, and common means for adjusting the sprocket and screw conveyer relatively to the drum.

12. In a device of the character described, the combination of a plurality of strands of chain conveyers, a casing, a drum over which said chain conveyers are trained, a plate underlying the upper run of said chain conveyers and adapted to prevent the dropping of fines carried by said conveyers into the interior of the casing, and a scraper device engaging the drum and preventing the carriage of fines by the drum into the casing.

13. In a device of the character described, the combination of a plurality of conveyers, a casing in which said conveyers travel in slanting direction, a drum over which said conveyers are trained, a scraper device engaging the drum, and a plate underlying the upper run of said conveyers and yieldinly forcing the scraper device into engagement with the drum.

14. In a device of the character described, the combination of a plurality of juxtaposed chain conveyers, a casing in which said conveyers travel in slanting direction, a drum over which said conveyers are trained, a scraper plate slidably carried by the casing and guided therein for rectilinear movement, and a plate underlying the upper run of said conveyers and adapted to prevent the return of fines carried by the conveyers into the casing, said last named plate resting with its weight against the scraper plate to force the same into engagement with the drum.

15. In a device of the character described, the combination of a plurality of juxtaposed chain conveyers, sprockets over which the individual conveyers are trained, said sprockets being mounted on a common shaft, scraper ribs secured to individual links of several of said conveyers and thereby rigidly connecting said conveyers, and pintles extending through alined links of all of said conveyers adapted to join said conveyers into a single carrier apron.

16. In a device of the character described, the combination of a chain conveyer, a casing in which said chain conveyer travels, a sprocket in the casing over which the chain conveyer is trained, a plate underlying the operative run of the chain conveyer, and a screw conveyer interposed between said plate and said sprocket for receiving the fines dropping from the chain conveyer, substantially as described.

17. In a device of the character described, the combination of a chain conveyer, a casing in which it travels, a plate underlying the operative run of the chain conveyer, a sprocket over which the chain conveyer is trained, a screw conveyer below the operative run of the chain conveyer and interposed between the sprocket and the plate, the screw conveyer being composed of two sections adapted to carry material dropping from the operative run of the chain conveyer to the screw conveyer, the screw conveyer being adapted to carry said material transversely of the casing in opposite directions, and means for returning said material carried by the screw conveyer into the interior of the casing.

18. In a device of the character described, the combination of an endless conveyer, a casing in which said conveyer is mounted to travel in a slanting direction, the casing having lateral walls, supporting means at the turning points and beneath said conveyer mounted in the casing, and a screw conveyer positioned near the discharge end of the conveyer for receiving fines dropping through and being carried by the conveyer.

19. In a device of the character described, the combination of an endless conveyer, a casing in which said conveyer is mounted to travel in a slanting direction, the casing having lateral walls, supporting means at the turning points of said conveyer mounted in the casing, a plate supporting the operative run of the conveyer and extending between said walls, and means positioned relative to the conveyer for returning material dropping on said supporting plate to the interior of the casing below the return run of the conveyer.

In testimony whereof I affix my signature at 5054 Plankington Building, Milwaukee, Wis.

GEORGE MANIERRE.